(12) United States Patent
Gillessen et al.

(10) Patent No.: US 12,420,528 B2
(45) Date of Patent: Sep. 23, 2025

(54) COMPOSITE PANE

(71) Applicant: SAINT-GOBAIN GLASS FRANCE, Courbevoie (FR)

(72) Inventors: Stephan Gillessen, Alsdorf (DE); Lisa Schmadtke, Würselen (DE); Jefferson Do Rosario, Aachen (DE); Robert Besler, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 248 days.

(21) Appl. No.: 18/247,033

(22) PCT Filed: Sep. 29, 2021

(86) PCT No.: PCT/EP2021/076762
§ 371 (c)(1),
(2) Date: Mar. 28, 2023

(87) PCT Pub. No.: WO2022/069526
PCT Pub. Date: Apr. 7, 2022

(65) Prior Publication Data
US 2023/0405975 A1    Dec. 21, 2023

(30) Foreign Application Priority Data

Oct. 1, 2020  (DE) .................. 20 2020 105 642.5
Oct. 1, 2020  (DE) .................. 102020125722.8

(51) Int. Cl.
B32B 17/10    (2006.01)
(52) U.S. Cl.
CPC .. B32B 17/10036 (2013.01); B32B 17/10229 (2013.01); B32B 17/10385 (2013.01);
(Continued)

(58) Field of Classification Search
CPC ........ B32B 17/10036; B32B 17/10229; B32B 17/10385; B32B 17/10899
(Continued)

(56) References Cited

U.S. PATENT DOCUMENTS

2009/0104385 A1    4/2009  Reymond et al.
2015/0298431 A1*  10/2015  Von Der Weiden ........................ B32B 17/10036
                                                                 156/306.6

(Continued)

FOREIGN PATENT DOCUMENTS

DE        103 52 464 A1    6/2005
DE    10 2008 018147 A1   10/2009
(Continued)

OTHER PUBLICATIONS

International Search Report as issued in International Patent Application No. PCT/EP2021/076762, dated Dec. 14, 2021.

*Primary Examiner* — Tahseen Khan
(74) *Attorney, Agent, or Firm* — Pillsbury Winthrop Shaw Pittman LLP (57) ABSTRACT

A composite pane includes a laminated stacking sequence composed of an outer pane with an exterior-side surface and an interior-side surface, an inner pane with an exterior-side surface and an interior-side surface, and at least one thermoplastic intermediate layer, which joins the interior-side surface of the outer pane to the exterior-side surface of the inner pane, wherein a heatable element is applied directly on the interior-side surface of the outer pane or on the exterior-side surface of the inner pane, and a thermal-radiation-reflecting coating is applied directly on the interior-side surface of the inner pane and/or a thermal-radiation-reflecting coating is applied directly on the exterior-side surface of the outer pane.

19 Claims, 3 Drawing Sheets

(52) U.S. Cl.
CPC .. *B32B 17/10899* (2013.01); *B32B 2307/306* (2013.01); *B32B 2307/7376* (2023.05); *B32B 2311/08* (2013.01)

(58) Field of Classification Search
USPC .......................................................... 428/213
See application file for complete search history.

(56) References Cited

U.S. PATENT DOCUMENTS

| | | | | |
|---|---|---|---|---|
| 2015/0331296 | A1* | 11/2015 | Mennig | B32B 17/10174 |
| | | | | 156/99 |
| 2017/0135155 | A1* | 5/2017 | Klein | H05B 3/18 |
| 2017/0327420 | A1* | 11/2017 | Schulz | C03C 17/36 |
| 2018/0170013 | A1* | 6/2018 | Hubert | E06B 9/24 |
| 2018/0176995 | A1* | 6/2018 | Klein | B32B 17/10036 |
| 2018/0244242 | A1* | 8/2018 | Lisinski | B60S 1/026 |
| 2019/0329529 | A1* | 10/2019 | Schulz | B32B 17/10568 |
| 2020/0061974 | A1* | 2/2020 | Dröge | B32B 17/10302 |
| 2020/0070478 | A1* | 3/2020 | Weber | H03K 17/962 |
| 2020/0400997 | A1* | 12/2020 | Schulz | B32B 17/10036 |

FOREIGN PATENT DOCUMENTS

| | | | |
|---|---|---|---|
| DE | 10 2008 029986 A1 | 1/2010 | |
| EP | 2 718 098 B1 | 4/2018 | |
| WO | WO 00/07263 A1 | 2/2000 | |
| WO | WO 2013/104438 A1 | 7/2013 | |
| WO | WO 2013/104439 A1 | 7/2013 | |
| WO | WO 2013/131667 A1 | 9/2013 | |
| WO | WO 2016/020113 A1 | 2/2016 | |
| WO | WO 2017/077128 A1 | 5/2017 | |
| WO | WO 2019/179683 A1 | 9/2019 | |
| WO | WO-2019170330 A1 * | 9/2019 | ....... B32B 17/10036 |
| WO | WO 2020/094422 A1 | 5/2020 | |

* cited by examiner

COMPOSITE PANE

CROSS-REFERENCE TO RELATED APPLICATIONS

This application is the U.S. National Stage of PCT/EP2021/076762, filed Sep. 29, 2021, which in turn claims priority to German patent application number 102020125722.8 filed Oct. 1, 2020. The content of these applications are incorporated herein by reference in their entireties.

The invention relates to a composite pane that is electrically heatable and a method for production thereof.

Panes with an electric heating layer are known per se and have already been described many times in the patent literature. Reference is made purely by way of example in this context to DE 102008018147 A1, DE 102008029986 A1, and WO 00/7263 A1. In motor vehicles, they are often used as windshields, since, due to legal requirements, the central field of vision must not have any visual restrictions, with the exception of heating wires. The heat generated by the heating layer can remove condensed moisture, ice, and snow within a short time. In most cases, such panes are produced as composite panes in which two individual panes are joined to one another via a thermoplastic adhesive layer. The heating layer can be applied on one of the inner surfaces of the individual panes; however, structures are also known in which it is situated on a carrier that is arranged between the two individual panes. Alternatively, a composite pane can also be heated by means of heating wires. A composite pane with heatable wires is disclosed in DE 103 52 464 A1.

In a vehicle, prior art heatable composite panes constitute a major electrical load. Generally, in prior art heatable composite panes, the heating element, i.e., heating wires or a heatable layer, is arranged on the outer side of the inner pane. When a voltage is applied, the heating element heats up and the heat is transported into the thermoplastic intermediate layer of the composite pane, the outer pane, and the inner pane by thermal conduction. Since glass generally conducts heat better than the thermoplastic intermediate layer, the heat of the heating element arranged on the outer side of the inner pane is primarily conducted to the inner pane and hardly conducted to the outer pane via the thermoplastic intermediate layer. Standard glass has emissivity of approx. 80% to 90%. Thus, with prior art heatable composite panes, the outer side of the outer pane is not as hot as the inner side of the inner pane. Consequently, much energy is consumed for removal of ice and snow on the outer side of the outer pane.

EP 2 718 098 B1 discloses a composite pane with a heatable first coating and a second coating, wherein the second coating has low emissivity. US 2009/0104385 A1 discloses a composite pane with an anti-reflection coating and coatings with other functionalities.

The object of the present invention consists in providing a composite pane that is electrically heatable and in which the heating function is improved.

This object is accomplished according to the proposal of the invention by a composite pane in accordance with claim 1 and a method in accordance with claim 15. Advantageous embodiments of the invention are apparent from the subclaims.

The invention relates to a composite pane, at least comprising a laminated stacking sequence composed of an outer pane with an exterior-side surface and an interior-side surface, an inner pane with an exterior-side surface and an interior-side surface, and at least one thermoplastic intermediate layer that joins the interior-side surface of the outer pane to the exterior-side surface of the inner pane.

According to the invention, a heatable element is applied directly on the interior-side surface of the outer pane or on the exterior-side surface of the inner pane.

In addition, according to the invention, a thermal-radiation-reflecting coating is applied directly on the interior-side surface of the inner pane and/or a thermal-radiation-reflecting coating is applied directly on the exterior-side surface of the outer pane.

The composite pane is intended, in a window opening, to separate an interior, in particular the interior of a vehicle or a building from the external surroundings. The composite pane is a laminate and comprises a first and a second glass pane, referred to in the context of the invention as the "outer pane and inner pane" and joined to one another via a thermoplastic intermediate layer. In the context of the invention, "inner pane" refers to the pane facing the interior in the installed position. "Outer pane" refers to the pane facing the external surroundings in the installed position. In the context of the invention, the "interior-side surface (inside surface or inner side or inner surface)" means that surface of the pane that faces the interior in the installed position. In the context of the invention, the "exterior-side surface (or outside or outer surface)" means that surface of the pane that faces the external surroundings in the installed position.

The surfaces of the glass panes are typically referred to as follows:

The exterior-side surface of the outer pane is referred to as side I. The interior-side surface of the outer pane is referred to as side II. The exterior-side surface of the inner pane is referred to as side III. The interior-side surface of the inner pane is referred to as side IV.

The interior-side surface II of the outer pane and the exterior-side surface III of the inner pane face one another and are joined to one another by means of the at least one thermoplastic intermediate layer.

According to the invention, a thermal-radiation-reflecting coating is applied directly on the interior-side surface IV of the inner pane and/or directly on the exterior-side surface I of the outer pane. Such coatings are known, for example, from WO2013/131667A1. The thermal-radiation-reflecting coating can also be referred to as a low emissivity coating, emissivity-reducing coating, thermal-radiation-reducing coating, low-E coating, or low-E layer. Its function is to reflect thermal radiation, i.e., in particular IR radiation, which has longer wavelengths than the IR component of solar radiation.

The thermal-radiation-reflecting coating preferably extends over the entire interior-side surface IV of the inner pane and/or over the entire exterior-side surface I of the outer pane.

It is also possible for the thermal-radiation-reflecting coating to extend over only part of the interior-side surface IV of the inner pane and/or over only part of the exterior-side surface I of the outer pane.

In one embodiment, a protective layer is applied to the thermal-radiation-reflecting coating. This optional protective layer serves to protect against corrosion and/or damage.

In a particularly advantageous embodiment of the invention, the heatable element is applied directly on the exterior-side surface III of the inner pane, and a thermal-radiation-reflecting coating is applied directly on the interior-side surface IV of the inner pane.

In another advantageous embodiment of the invention, the heatable element is applied directly on the interior-side surface II of the outer pane, and a thermal-radiation-reflecting coating is applied directly on the interior-side surface IV of the inner pane.

In another advantageous embodiment of the invention, the heatable element is applied directly on the interior-side surface II of the outer pane, and a thermal-radiation-reflecting coating is applied directly on the exterior-side surface I of the outer pane.

In another advantageous embodiment of the invention, the heatable element is applied directly on the exterior-side surface III of the inner pane, and a thermal-radiation-reflecting coating is applied directly on the exterior-side surface I of the outer pane.

In another advantageous embodiment of the invention, the heatable element is applied directly on the exterior-side surface III of the inner pane, a thermal-radiation-reflecting coating is applied directly on the exterior-side surface IV of the inner pane, and a thermal-radiation-reflecting coating is applied directly on the exterior-side surface I of the outer pane.

In another advantageous embodiment of the invention, the heatable element is applied directly on the interior-side surface II of the outer pane, a thermal-radiation-reflecting coating is applied directly on the exterior-side surface IV of the inner pane, and a thermal-radiation-reflecting coating is applied directly on the exterior-side surface I of the outer pane.

When a thermal-radiation-reflecting coating is arranged on the interior-side surface IV of the inner pane, the coating prevents thermal radiation from the inner pane heated by the heatable element to the interior. The emission of thermal radiation into the interior is thus reduced and the composite pane is heated more efficiently.

When a thermal-radiation-reflecting coating is arranged on the exterior-side surface I of the outer pane, this coating prevents thermal radiation from the outer pane heated by the heatable element to the outside. The emission of thermal radiation into the external surroundings is thus reduced and the composite pane is heated more efficiently.

When a thermal-radiation-reflecting coating is arranged on the interior-side surface IV of the inner pane and a thermal-radiation-reflecting coating is arranged on the exterior-side surface I of the outer pane, both the thermal radiation of the inner pane heated by the heatable element to the interior and the thermal radiation of the outer pane heated by the heatable element to the outside are prevented such that the composite pane is heated particularly efficiently and emission of thermal radiation into the external surroundings or the interior is reduced.

As described above, in the composite pane according to the invention, the emission of thermal radiation into the interior is reduced by the thermal-radiation-reflecting coating on the interior-side surface IV of the inner pane and/or the emission of thermal radiation into the external surroundings is reduced by the thermal-radiation-reflecting coating on the exterior-side surface I of the outer pane, as a result of which the composite pane is heated more efficiently than prior art composite panes. The composite panes according to the invention consume less power for the same heating effect than prior art composite panes. The same heating effect is reached sooner or less power has to be provided to achieve the same heating effect within a certain time.

The thermal-radiation-reflecting coating on the interior-side surface IV of the inner pane and/or the thermal-radiation-reflecting coating on the exterior-side surface I of the outer pane reduce both the emission of thermal radiation from the vehicle interior into the external surroundings when outside temperatures are cold and radiation of heat or cold into the vehicle interior. The so-called "cold-wall effect" is thus reduced.

The heatable element can be implemented as a heatable coating.

Preferably, the heatable coating comprises a layer system with at least one metal layer embedded between dielectric oxide or nitride layers, in particular at least one metallic silver layer.

Alternatively, the heatable element can be implemented as at least one heatable wire, with a tungsten wire being preferred.

In a particularly preferred embodiment, the heatable element is implemented as at least one tungsten wire. In other words, particularly preferably, the heatable element is implemented as a tungsten wire or an arrangement of tungsten wires.

The heatable element can, for example, also be implemented in the form of printed silver wires.

Preferably, the heatable element implemented as a heatable coating extends over the entire interior-side surface II of the outer pane minus a circumferential frame-shaped coating-free region with a width of 1 mm to 50 cm, preferably of 2 mm to 20 cm, and particularly preferably of 1 cm to 20 cm, or over the entire exterior-side surface III of the inner pane minus a circumferential frame-shaped coating-free region with a width of 1 mm to 50 cm, preferably of 2 mm to 20 cm, and particularly preferably of 1 cm to 20 cm. The coating-free edge region is hermetically sealed by adhesive bonding to the thermoplastic intermediate layer. The heatable coating is thus advantageously protected against damage and corrosion emanating, in particular, from the edge of the composite pane.

Alternatively, the heatable coating can also extend over the entire interior-side surface II of the outer pane or over the entire exterior-side surface III of the inner pane.

Optionally, local regions which, as communication, sensor, or camera windows, are intended to ensure transmission of electromagnetic radiation through the composite pane are not provided with the heatable coating and/or the thermal-radiation-reflecting coating.

The heatable coating and the thermal-radiation-reflecting coating are, in each case, a transparent functional coating, intended to provide the pane surface with modified properties. In the context of the invention, a coating is considered "transparent" if it has average transmittance in the visible spectral range of at least 70%, preferably at least 80%, and thus does not substantially restrict vision through the vehicle pane. The heatable coating and the thermal-radiation-reflecting coating are in each case, in particular, a thin-film coating, i.e., formed as a thin-film or a thin-film stack.

A heatable coating is an electrically conductive coating through which current flows when it is electrically contacted. The electrical conductivity is, in particular, provided in that one or more individual layers of the coating are formed as electrically conductive layers, for example, based on a metal, in particular based on silver, alternatively, for example, based on gold, aluminum, or copper. In addition to the at least one electrically conductive layer, there are usually dielectric layers intended, for example, as anti-reflection layers to increase light transmittance, as matching layers to improve the crystallinity of the electrically conductive layer, or as smoothing layers to improve the surface structure for the overlying layers. Customary materials for the dielectric layers include silicon nitride, titanium oxide, aluminum nitride, tin oxide, zinc oxide, mixed tin-zinc oxide, and silicon oxide.

The thickness of an electrically conductive layer of the heatable coating is preferably from 5 nm to 50 nm, particularly preferably from 8 nm to 25 nm. In this range for the thickness of the electrically conductive layer, advantageously high transmittance in the visible spectral range and particularly advantageous electrical conductivity are achieved.

Typically, at least one dielectric layer is arranged in each case between two adjacent electrically conductive layers of the heatable coating. Preferably, a further dielectric layer is arranged below the first and/or above the last electrically conductive layer. A dielectric layer contains at least one individual layer of a dielectric material, for example, a nitride such as silicon nitride or an oxide such as aluminum oxide. The dielectric layer can, however, also include multiple individual layers, for example, individual layers of a dielectric material, smoothing layers, matching layers, blocking layers, and/or anti-reflection layers. The thickness of a dielectric layer is, for example, from 10 nm to 200 nm.

This layer structure is generally obtained by a sequence of deposition operations carried out by a vacuum method such as magnetron-enhanced cathodic sputtering.

Heatable coatings are known, for example, from WO2013/104438 A1, WO2013/104439 A1, or WO 2016/020113 A1.

The heatable coating can, for example, also be one of the conductive coatings described in WO 2019/179683 A1 or WO 2020/094422 A1.

The thermal-radiation-reflecting coating preferably comprises a functional layer that contains a transparent conductive oxide (TCO), preferably indium tin oxide (ITO), tin oxide doped with antimony or fluorine, and/or zinc oxide doped with gallium and/or aluminum (ZnO:Ga, or ZnO:Al), with indium tin oxide being preferred. The functional layer can, however, also contain other electrically conductive oxides, for example, fluorine-doped tin oxide ($SnO_2$:F), antimony-doped tin oxide ($SnO_2$:Sb), mixed indium-zinc oxide (IZO), gallium-doped or aluminum-doped zinc oxide, niobium-doped titanium oxide, cadmium stannate, and/or zinc stannate. Particularly good results in terms of emissivity and bendability of the coating according to the invention are achieved with these. The refractive index of the material of the functional layer is preferably 1.7 to 2.5.

The indium tin oxide is preferably deposited by magnetron-enhanced cathodic sputtering using a target of indium tin oxide. The target preferably contains from 75 wt.-% to 95 wt.-% indium oxide and from 5 wt.-% to 25 wt.-% tin oxide as well as production-related admixtures. The deposition of the tin-doped indium oxide is preferably carried out under a protective gas atmosphere, for example, argon. A small proportion of oxygen can also be added to the protective gas, for example, to improve the homogeneity of the functional layer.

The target can, alternatively, preferably contain at least from 75 wt.-% to 95 wt.-% indium and from 5 wt.-% to 25 wt.-% tin. The deposition of the indium tin oxide is preferably carried out under the addition of oxygen as a reaction gas during the cathodic sputtering.

The thermal-radiation-reflecting coating also typically includes dielectric layers, in particular formed from dielectric oxides or nitrides, such as ZnO, SnZnO, AlN, $TiO_2$, $SiO_2$, or $Si_3N_4$. The layer of reflecting conductive oxide is made anti-reflective by the use of additional dielectric layers above and below in order to ensure sufficiently low reflection from the inner side.

The emissivity of the pane according to the invention can be influenced by the thickness of the functional layer of the thermal-radiation-reflecting coating. The thickness of the functional layer is preferably 40 nm to 200 nm, particularly preferably 60 nm to 150 nm, and most particularly preferably 65 nm to 85 nm, for example, approx. 75 nm. In this range for the thickness, particularly advantageous values for emissivity and a particularly advantageous capability of the thermal-radiation-reflecting coating to withstand a mechanical transformation, such as bending or tempering, without damage are achieved.

The interior-side emissivity of the composite pane according to the invention is preferably less than or equal to 50%, particularly preferably from 10% to 50%, most particularly preferably from 10% to 35%. "Interior-side emissivity" refers to the measurement that indicates how much thermal radiation the pane in the installed position emits into an interior, for example, of a building or a vehicle, compared to an ideal thermal radiator (a black body). In the context of the invention, "emissivity" means the normal emissivity at 283 K per the EN 12898 standard.

In one embodiment of the invention, the heatable element, which can be implemented as described above as a heatable coating or as heatable wires, is connected to a voltage source in order to conduct an electric current through the heatable element, which heats up as a result. Suitable voltages are, in particular, on-board voltages customary in the vehicle sector, for example, 12 V to 14 V or, in the case of electric vehicles, typical on-board voltages of up to 500 V. For connection to the voltage source, the heatable element is preferably provided with bus bars that can be connected to the poles of the voltage source. The bus bars can, for example, be implemented as printed and baked conductors, typically in the form of a baked screen printing paste with glass frits and silver particles. However, alternatively, strips of an electrically conductive foil that are laid on or glued onto the heatable coating or the ends of the heatable wires, for example, copper foil or aluminum foil, can be used as bus bars. Typically, the two bus bars are positioned in the vicinity of two opposite edges of the composite pane, for example, the upper and lower edge.

The thermoplastic intermediate layer is formed by one or more thermoplastic polymer films. The thermoplastic films preferably contain polyvinyl butyral (PVB), ethylene vinyl acetate (EVA), polyurethane (PU), and/or mixtures thereof and/or copolymers thereof, particularly preferably polyvinyl butyral. The films are preferably formed on the basis of the materials mentioned, but can contain other components, for example, plasticizers, colorants, IR or UV absorbers, preferably in a proportion of less than 50%.

The individual polymer films, in particular the PVB films, preferably have a thickness of approx. 0.025 mm (25 µm) to 1 mm, in particular of 25 µm to 125 µm, and of 0.3 mm to 1 mm, for example, 50 µm, 100 µm, 0.38 mm, or 0.76 mm. Other properties of the composite glass pane can be influenced via the thickness of the films. For example, thicker PVB films are responsible for improved sound attenuation, in particular, when they contain an acoustically effective core, increased break-in resistance of the composite glass pane, and also increased protection against ultraviolet radiation (UV protection).

In an advantageous embodiment, the thermoplastic intermediate layer is formed from one or more polyvinyl butyral films.

Furthermore, the thermoplastic intermediate layer can be a functional intermediate layer, in particular an intermediate layer with acoustically damping properties, an intermediate layer tinted at least in some sections, and/or an intermediate layer colored at least in some sections.

The outer pane and/or the inner pane can be formed from glass and/or polymers, preferably soda lime glass, alkali aluminosilicate glass, polycarbonate, and/or polymethyl methacrylate. In a particularly preferred embodiment, the outer pane and the inner pane are formed from glass.

Suitable glass panes include glass panes known under the trade names Planiclear and Planilux (clear glass in each case), VG10, VG20, VG40, or TSANx, TSA3+, TSA4+ from Saint-Gobain, with the glasses of the VG series being gray-colored glasses and those of the TSA series being green-colored glasses.

Preferably, the outer pane and/or the inner pane have a thickness of 0.5 mm to 4 mm, particularly preferably a thickness of 1.6 mm to 2.1 mm. The outer pane and/or the inner pane can have a constant thickness or even be slightly wedge-shaped.

The outer pane, the inner pane, and the at least one thermoplastic intermediate layer can be clear and colorless, but also tinted or colored. In a preferred embodiment, the total transmittance through the composite glass is greater than 70%. The term "total transmittance" is based on the process for testing the light permeability of motor vehicle windows specified by ECE-R 43, Annex 3, § 9.1. The outer pane and the inner pane can, independently of one another, be non-prestressed, partially prestressed, or prestressed. If at least one of the panes is to be prestressed, this can be thermal or chemical prestressing.

The composite pane is preferably curved in one or a plurality of spatial directions, as is customary for motor vehicle window panes, wherein typical radii of curvature are in the range from approx. 10 cm to approx. 40 m. The composite pane can, however, also be flat, for example, when it is intended as a pane for buses, trains, or tractors.

The outer pane, the inner pane, and the at least one thermoplastic intermediate layer can have suitable coatings known per se, for example, anti-reflection coatings, nonstick coatings, scratch-resistant coatings, or photocatalytic coatings.

The heatable element can, as described above, be connected to a voltage source. According to the invention, there is also a composite pane as previously described, wherein the heatable element is connected to a voltage source.

A composite pane according to the invention can, additionally, include a masking print, made in particular from a dark, preferably black, enamel. The masking print is, in particular, a peripheral, i.e., frame-like, masking print. The peripheral masking print serves primarily as UV protection for the mounting adhesive of the composite pane. The masking print can be opaque and cover the entire surface. The masking print can also be implemented, at least in sections, semitransparent, for example, as a point grid, strip grid, or checkered grid. Alternatively, the masking print can also have a gradient, for example, from an opaque covering to a semitransparent covering. The masking print is customarily applied on the interior-side surface of the outer pane or on the interior-side surface of the inner pane, with the masking print preferably applied on a pane surface on which, in the composite pane according to the invention, neither a heatable coating nor a thermal-radiation-reflecting coating is arranged.

The invention also relates to a method for producing a composite pane, at least comprising the following steps:
  a) Providing an outer pane having an exterior-side surface I and an interior-side surface II, an inner pane having an exterior-side surface III and an interior-side surface IV, and at least one thermoplastic intermediate layer, wherein a heatable element is applied directly on the interior-side surface II of the outer pane or on the exterior-side surface III of the inner pane, and a thermal-radiation-reflecting coating is applied directly on the interior-side surface IV of the inner pane, and/or a thermal-radiation-reflecting coating is applied directly on the exterior-side surface I of the outer pane;
  b) Forming a stacking sequence composed of the outer pane, the at least one thermoplastic intermediate layer, and the inner pane such that the interior-side surface II of the outer pane and the exterior-side surface III of the inner pane face one another, and the at least one thermoplastic intermediate layer is arranged between the outer pane and the inner pane;
  c) Joining the outer pane and the inner pane via the at least one thermoplastic intermediate layer to form a composite pane in a lamination process.

The lamination is preferably carried out under the action of heat, vacuum, and/or pressure. Methods known per se can be used for the lamination, for example, autoclave methods, vacuum bag methods, vacuum ring methods, calender methods, vacuum laminators, or combinations thereof.

The thermal-radiation-reflecting coating is preferably applied by physical vapor deposition (PVD) on the interior-side surface IV of the inner pane and/or on the exterior-side surface I of the outer pane, particularly preferably by cathodic sputtering ("sputtering"), particularly preferably by magnetron-enhanced cathodic sputtering.

If the heatable element is implemented as a heatable coating, this is preferably applied by physical vapor deposition (PVD) on the interior-side surface II of the outer pane or on the exterior-side surface III of the inner pane, particularly preferably by cathodic sputtering ("sputtering"), most particularly preferably by magnetron-enhanced cathodic sputtering.

It goes without saying that bus bars necessary for the connection of the heatable element to a voltage source are applied prior to the lamination step.

If the composite pane is to be bent, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C.

In one embodiment of the method according to the invention, the thermal-radiation-reflecting coating is applied on the interior-side surface (IV) of the inner pane only after the lamination process, and/or the thermal-radiation-reflecting coating is applied on the exterior-side surface (I) of the outer pane only after the lamination process.

The composite pane according to the invention can be used in a vehicle on water, on land, or in the air, preferably as a windshield of a vehicle, particularly preferably as a windshield of a motor vehicle, in particular a passenger car. Alternatively, the composite pane according to the invention can also be used in building glazing or in other architectural glazing.

The various embodiments of the invention can be implemented individually or in any combinations. In particular, the features mentioned above and those to be explained in the following can be used not only in the combinations indicated, but also in other combinations or in isolation, without departing from the scope of the present invention.

The invention is now explained in detail using exemplary embodiments, with reference to the accompanying figures.

The figures in no way restrict the invention. They depict, in simplified, not-to-scale representation.

Figure 1:
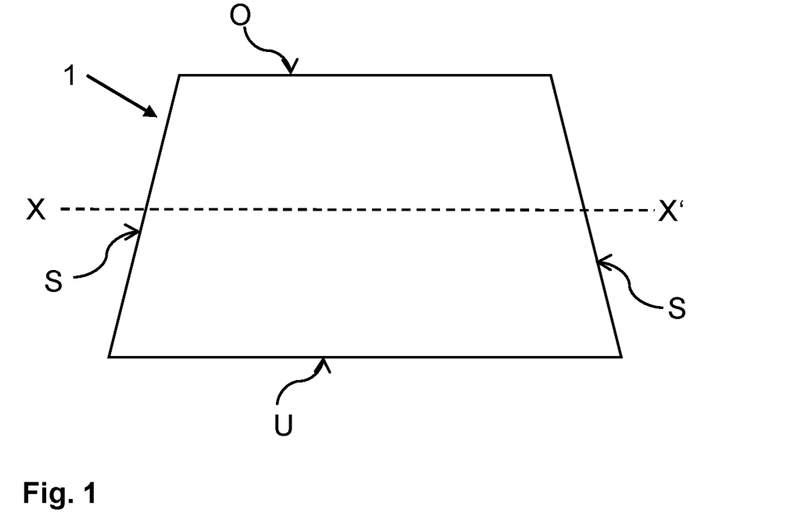
FIG. 1 a plan view of an embodiment of a composite pane according to the invention, FIG. 2 the cross-section through the embodiment of a composite pane according to the invention depicted in FIG. 1, FIG. 3 the cross-section through another embodiment of a composite pane according to the invention, FIG. 4 the cross-section through another embodiment of a composite pane according to the invention, FIG. 5 the cross-section through another embodiment of a composite pane according to the invention, FIG. 6 the cross-section through another embodiment of a composite pane according to the invention, FIG. 7 the cross-section through another embodiment of a composite pane according to the invention, and FIG. 8 the cross-section through another embodiment of a composite pane according to the invention.
Figure 2:
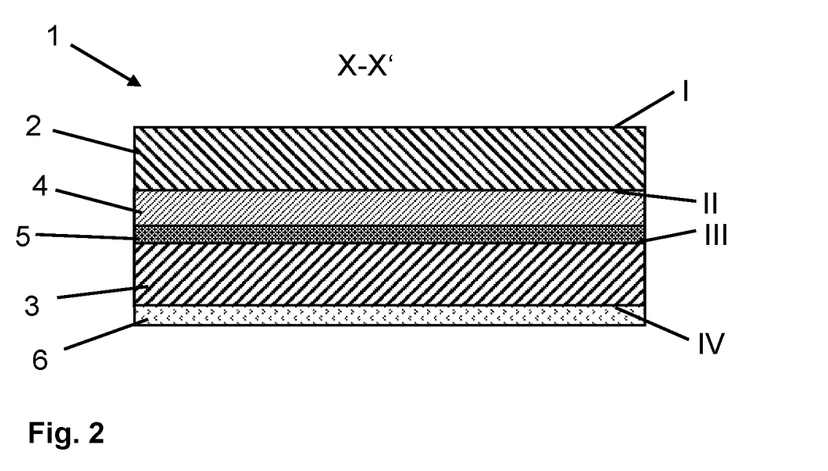

FIG. 1 depicts a plan view of an embodiment of a composite pane 1 according to the invention and FIG. 2 depicts the cross-section through the composite pane depicted in FIG. 1 along the section line X-X'. As can be seen in FIGS. 1 and 2, the composite pane 1 has an upper edge O and a lower edge U and two side edges S. The composite pane 1 comprises an outer pane 2 and an inner pane 3 that are laminated to one another via a thermoplastic intermediate layer 4 and thus permanently joined. The composite pane 1 is provided, for example, as a windshield of a passenger car, wherein the outer pane 2 is intended to face the external surroundings, and the inner pane 3 is intended to face the vehicle interior. The outer pane 2 has an exterior-side surface I and an interior-side surface II. The inner pane 3 has an exterior-side surface III and an interior-side surface IV. The exterior-side surfaces I and III face the external surroundings in the installed position; the interior-side surfaces II and IV face the vehicle interior in the installed position. The interior-side surface II of the outer pane 2 and the exterior-side surface III of the inner pane 3 face one another. The outer pane 2 contains, for example, soda lime glass and has, for example, a thickness of 2.1 mm. The inner pane 3 contains, for example, soda lime glass and has, for example, a thickness of 1.6 mm. The thermoplastic intermediate layer 4 contains or consists of polyvinyl butyral (PVB) and has, for example, a thickness of 0.76 mm. It goes without saying that composite panes 1 according to the invention can also have different dimensions adapted to the individual case and, in particular, other layer thicknesses for the outer pane 2, the inner pane 3, and the thermoplastic intermediate layer 4.

A heatable element 5 in the form of a heatable coating is arranged on the exterior-side surface III of the inner pane 3. The heatable coating is constructed, for example, as described in WO 2020/094422 A1 and comprises at least four electrically conductive silver layers, which are, in each case, arranged between two dielectric layers or layer sequences, with the sum of the thicknesses of all electrically conductive silver layers being at most 30 nm and at least one of the electrically conductive silver layers having a thickness of at most 5 nm.

A thermal-radiation-reflecting coating 6 is arranged on the interior-side surface IV of the inner pane 3. The thermal-radiation-reflecting coating 6 comprises, for example, a functional ITO layer with a thickness of 60 nm to 150 nm and, also, further dielectric layers above and below the functional layer, made in particular of Al-doped $SiO_2$ and $Si_3N_4$.

On the one hand, the thermal-radiation-reflecting coating 6 reduces the radiation of the thermal radiation emitted by the heatable element 5 implemented as a heatable coating through the composite pane into the vehicle interior. On the other hand, the thermal-radiation-reflecting coating 6 also reduces the radiation of thermal radiation out of the vehicle interior at low outside temperatures.

The heatable element 5 can be connected to a voltage source via bus bars (not shown in FIGS. 1 and 2).

Figure 3:
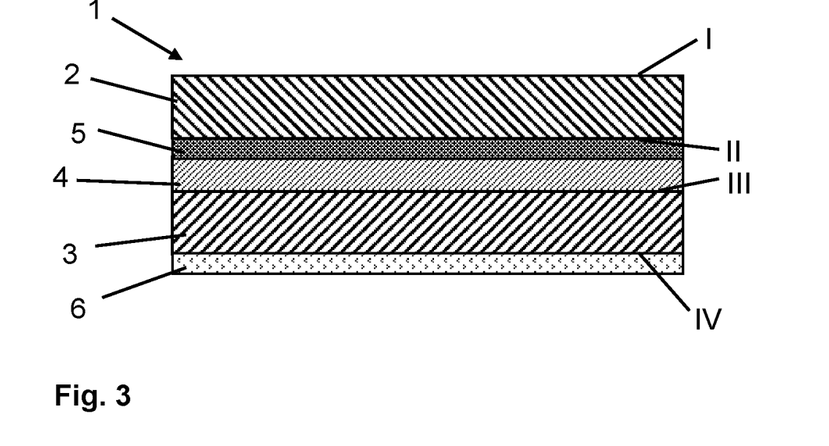

FIG. 3 depicts the cross-section of another embodiment of a composite pane 1 according to the invention. The composite pane 1 depicted in cross-section in FIG. 3 differs from the composite pane 1 depicted in cross-section in FIG. 2 only in that the heatable element 5 implemented as a heatable coating is not applied on the exterior-side surface III of the inner pane 3, but, instead, on the interior-side surface II of the outer pane 2.

Figure 4:
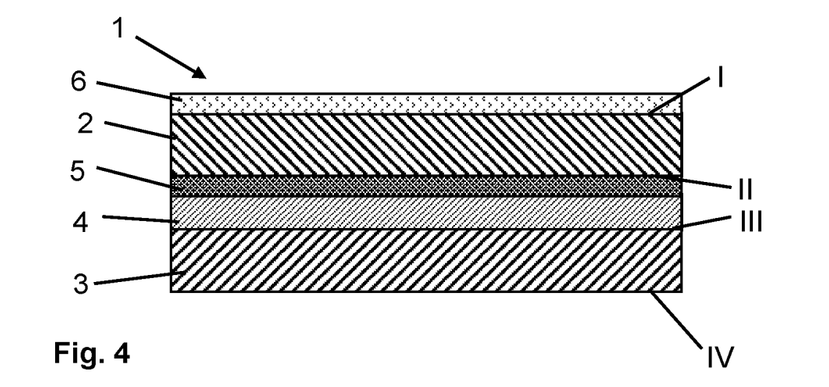

FIG. 4 depicts a cross-section of another embodiment of a composite pane 1 according to the invention. The composite pane 1 depicted in cross-section in FIG. 4 comprises an outer pane 2 and an inner pane 3 that are laminated to one another via a thermoplastic intermediate layer 4 and thus permanently joined. The composite pane 1 is provided, for example, as a windshield of a passenger car, wherein the outer pane 2 is intended to face the external surroundings, and the inner pane 3 is intended to face the vehicle interior. The outer pane 2 has an exterior-side surface I and an interior-side surface II. The inner pane 3 has an exterior-side surface III and an interior-side surface IV. The exterior-side surfaces I and III face the external surroundings in the installed position; the interior-side surfaces II and IV face the vehicle interior in the installed position. The interior-side surface II of the outer pane 2 and the exterior-side surface III of the inner pane 3 face one another. The outer pane 2 contains, for example, soda lime glass and has, for example, a thickness of 2.1 mm. The inner pane 3 contains, for example, soda lime glass and has, for example, a thickness of 1.6 mm. The thermoplastic intermediate layer 4 contains or consists of polyvinyl butyral (PVB) and has, for example, a thickness of 0.76 mm. It goes without saying that composite panes 1 according to the invention can also have different dimensions adapted to the individual case and, in particular, other layer thicknesses for the outer pane 2, the inner pane 3, and the thermoplastic intermediate layer 4.

A heatable element 5 in the form of a heatable coating is arranged on the interior-side surface II of the outer pane 2.

The heatable coating is constructed, for example, as described in WO 2020/094422 A1 and comprises at least four electrically conductive silver layers, which are, in each case, arranged between two dielectric layers or layer sequences, with the sum of the thicknesses of all electrically conductive silver layers being at most 30 nm and at least one of the electrically conductive silver layers having a thickness of at most 5 nm.

A thermal-radiation-reflecting coating 6 is arranged on the exterior-side surface I of the outer pane 2. The thermal-radiation-reflecting coating 6 comprises, for example, a functional ITO layer with a thickness of 60 nm to 150 nm and, also, further dielectric layers above and below the functional layer, made in particular of Al-doped $SiO_2$ and $Si_3N_4$.

On the one hand, the thermal-radiation-reflecting coating 6 reduces the radiation of the thermal radiation emitted by the heatable element 5 implemented as a heatable coating through the composite pane to the outside. On the other hand, the thermal-radiation-reflecting coating 6 also reduces the radiation of thermal radiation out of the vehicle interior at low outside temperatures.

Figure 5:
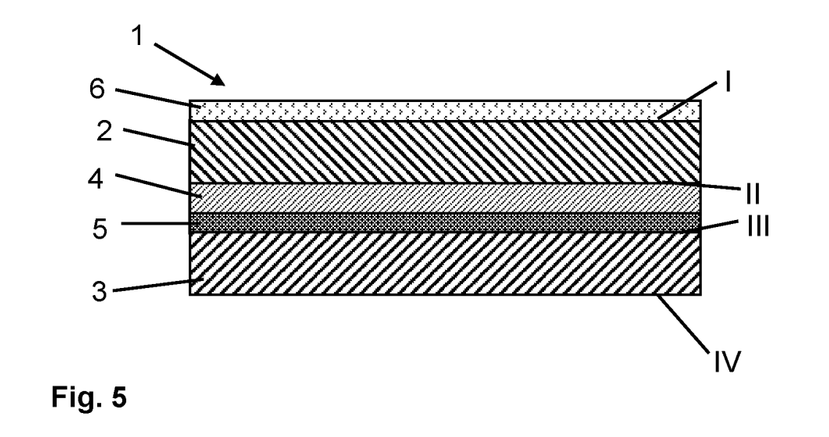

FIG. 5 depicts the cross-section of another embodiment of a composite pane 1 according to the invention. The composite pane 1 depicted in cross-section in FIG. 5 differs from that depicted in cross-section in FIG. 4 only in that the heatable element 5 implemented as a heatable coating is not applied on the interior-side surface II of the outer pane 2, but, instead, on the exterior-side surface III of the inner pane 3.

Figure 6:
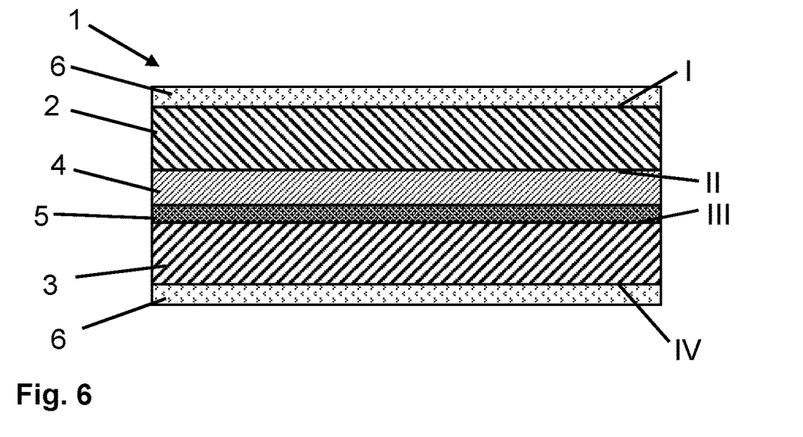

FIG. 6 depicts the cross-section of another embodiment of a composite pane 1 according to the invention. The composite pane 1 depicted in cross-section in FIG. 6 differs from that depicted in cross-section in FIG. 2 only in that a thermal-radiation-reflecting coating 6 is additionally applied on the exterior-side surface I of the outer pane 2.

Figure 7:
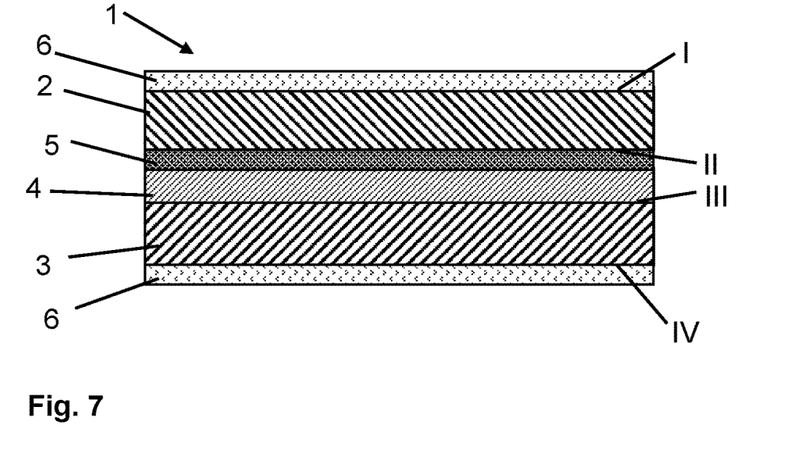

FIG. 7 depicts the cross-section of another embodiment of a composite pane 1 according to the invention. The composite pane 1 depicted in cross-section in FIG. 7 differs from that depicted in cross-section in FIG. 3 in that a thermal-radiation-reflecting coating 6 is additionally applied on the exterior-side surface I of the outer pane 2.

Figure 8:
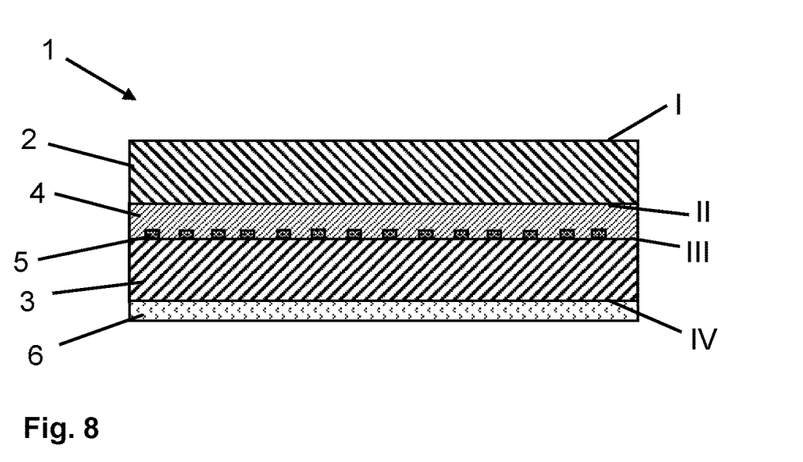

FIG. 8 depicts the cross-section of another embodiment of a composite pane 1 according to the invention. The embodiment of a composite pane 1 according to the invention depicted in cross-section in FIG. 8 differs from that depicted in FIG. 2 only in that the heatable element 5 is implemented as an arrangement of heatable wires. The heatable wires are, for example, tungsten wires with a diameter between 10 μm and 33 μm. This can be, for example, multiple wires arranged parallel to one another or a single-wire extending in a serpentine manner over the exterior-side surface III of the inner pane 3.

LIST OF REFERENCE CHARACTERS

1 composite pane
2 outer pane
3 inner pane
4 thermoplastic intermediate layer
5 heatable element
6 thermal-radiation-reflecting coating
X-X' section line
O upper edge
U lower edge
S side edge

The invention claimed is:

1. A composite pane, comprising a laminated stacking sequence composed of
   an outer pane with an exterior-side surface and an interior-side surface,
   an inner pane with an exterior-side surface and an interior-side surface, and
   at least one thermoplastic intermediate layer, which joins the interior-side surface of the outer pane to the exterior-side surface of the inner pane,
   wherein
   a heatable element is applied directly on the interior-side surface of the outer pane or on the exterior-side surface of the inner pane, and
   a thermal-radiation-reflecting coating is applied directly on the interior-side surface of the inner pane, and/or a thermal-radiation-reflecting coating is applied directly on the exterior-side surface of the outer pane.

2. The composite pane according to claim 1, wherein the heatable element is applied directly on the exterior-side surface of the inner pane, and the thermal-radiation-reflecting coating is applied directly on the interior-side surface of the inner pane.

3. The composite pane according to claim 1, wherein the heatable element is applied directly on the interior-side surface of the outer pane, and the thermal-radiation-reflecting coating is applied directly on the interior-side surface of the inner pane.

4. The composite pane according to claim 1, wherein the heatable element is applied directly on the interior-side surface of the outer pane, and the thermal-radiation-reflecting coating is applied directly on the exterior-side surface of the outer pane.

5. The composite pane according to claim 1, wherein the heatable element is applied directly on the exterior-side surface of the inner pane, and the thermal-radiation-reflecting coating is applied directly on the exterior-side surface of the outer pane.

6. The composite pane according to claim 1, wherein the heatable element is applied directly on the exterior-side surface of the inner pane, and wherein the thermal-radiation-reflecting coating includes a first thermal-radiation-reflecting coating that is applied directly on the exterior-side surface of the inner pane, and a second thermal-radiation-reflecting coating that is applied directly on the exterior-side surface of the outer pane.

7. The composite pane according to claim 1, wherein the heatable element is applied directly on the interior-side surface of the outer pane, and wherein the thermal-radiation-reflecting coating includes a first thermal-radiation-reflecting coating that is applied directly on the exterior-side surface of the inner pane, and a second thermal-radiation-reflecting coating that is applied directly on the exterior-side surface of the outer pane.

8. The composite pane according to claim 1, wherein the heatable element is implemented as a heatable coating.

9. The composite pane according to claim 8, wherein the heatable coating comprises a layer system with at least one metal layer embedded between dielectric oxide or nitride layers.

10. The composite pane according to claim 1, wherein the heatable element is implemented as at least one heatable wire.

11. The composite pane according to claim 10, wherein the heatable element is implemented as at least one heatable tungsten wire.

12. The composite pane according to claim 1, wherein the thermal-radiation-reflecting coating contains a transparent conductive oxide.

13. The composite pane according to claim 1, wherein the outer pane and/or the inner pane have a thickness of 0.5 mm to 4 mm.

14. The composite pane according to claim 1, wherein the heatable element is connected to a voltage source.

15. A method for producing a composite pane according to claim 1, comprising:
   a) providing an outer pane with an exterior-side surface and an interior-side surface, an inner pane with an exterior-side surface and an interior-side surface, and at least one thermoplastic intermediate layer, wherein a heatable element is applied directly on the interior-side surface of the outer pane or on the exterior-side surface of the inner pane, and a thermal-radiation-reflecting coating is applied directly on the interior-side surface of the inner pane and/or a thermal-radiation-reflecting coating is applied directly on the exterior-side surface of the outer pane;

b) forming a stacking sequence composed of the outer pane, the at least one thermoplastic intermediate layer, and the inner pane such that the interior-side surface of the outer pane and the exterior-side surface of the inner pane face one another and the at least one thermoplastic intermediate layer is arranged between the outer pane and the inner pane, and c) joining the outer pane and the inner pane via the at least one thermoplastic intermediate layer to form a composite pane in a lamination process.

16. The composite pane according to claim 9, wherein at least one metal layer is a metallic silver layer.

17. The composite pane according to claim 12, wherein the transparent conductive oxide is indium tin oxide, tin oxide doped with antimony or fluorine, and/or aluminum-doped zinc oxide (ZnO:Al), and/or gallium-doped zinc oxide (ZnO:Ga).

18. The composite pane according to claim 17, wherein the transparent conductive oxide is indium tin oxide.

19. The composite pane according to claim 13, wherein the thickness is from 1.6 mm to 2.1 mm.

* * * * *